Dec. 31, 1963   G. H. MOREY   3,116,392
APPARATUS FOR DISTILLING LIQUIDS
Filed Jan. 3, 1961   3 Sheets-Sheet 1

INVENTOR.
GLEN H. MOREY
BY
ATTORNEYS

Dec. 31, 1963　　　G. H. MOREY　　　3,116,392
APPARATUS FOR DISTILLING LIQUIDS
Filed Jan. 3, 1961　　　3 Sheets-Sheet 2

INVENTOR.
GLEN H. MOREY
BY
ATTORNEYS

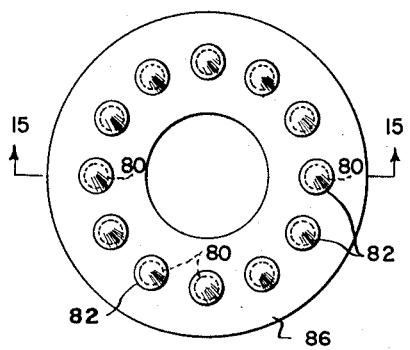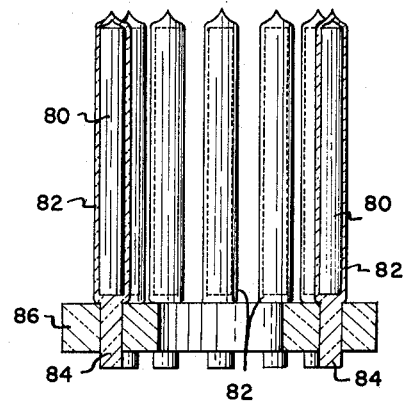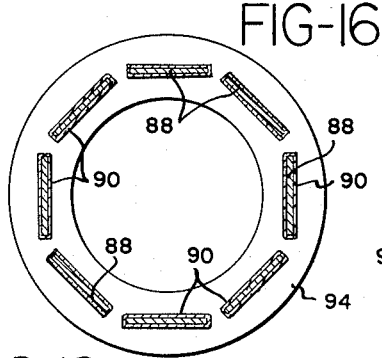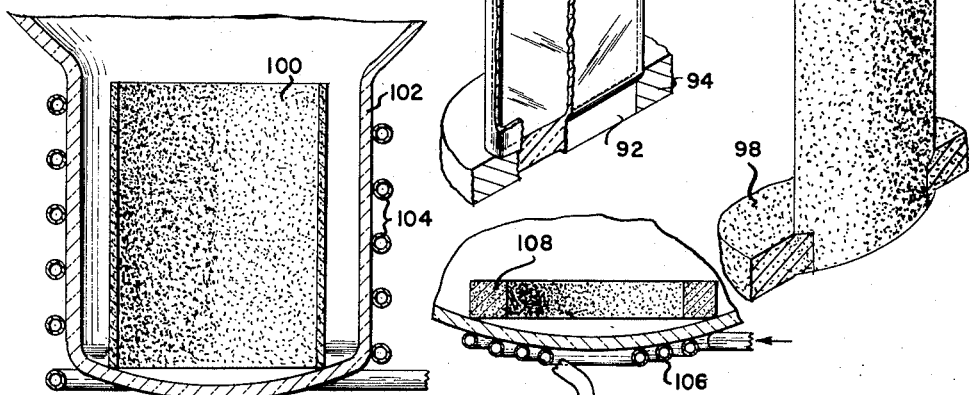

United States Patent Office 3,116,392
Patented Dec. 31, 1963

3,116,392
APPARATUS FOR DISTILLING LIQUIDS
Glen H. Morey, Terre Haute, Ind., assignor to Templeton Coal Company, Terre Haute, Ind., a corporation of Indiana
Filed Jan. 3, 1961, Ser. No. 80,203
12 Claims. (Cl. 219—10.49)

This invention relates to a method and apparatus for heating liquids and is particulary concerned with a method and apparatus for heating liquids in glass flasks or the like, as in connection with chemical processes, such as those involving distillation.

Many times, in carrying out chemical processes and in other circumstances, distillation of liquid is required. If the liquids are corrosive, it is necessary to distill the liquid from a glass flask, such as Pyrex glass or from some other suitably corrosive resistant materials.

Glass flasks are now being manufactured in sizes up to 50 gallons and these are ideal for the distilling of liquids, but heretofore the liquids have been heated from externally of the vessel and there was the possibility of cracking or breaking of the vessel on account of thermal strains that can be established therein by the external heating thereof.

The present invention has a primary objective, the provision of a method and apparatus for heating liquid within electrical, non-conductive vessels in such a manner as to eliminate the drawbacks referred to above that have characterized the heating.

Another objective of this invention is the provision of a method and apparatus for heating liquids in glass flasks or the like which will require the minimum of power and a minimum of insulation to obtain efficient conditions.

Still another objective of this invention is the provision of a method and apparatus for heating liquid in a glass flask, in which the heat is developed within the body of the liquid and does not have to be conveyed through the wall of the flask.

Still another objective of this invention is to provide an apparatus for heating liquid in a glass flask which can be utilized in existing flasks of electrical, non-conductive materials.

It is still a further objective of this invention to provide a specially constructed flask adapted for the practice of my invention, but not necessarily limited thereto.

The foregoing objectives as well as still other objectives of the present invention will become more apparent upon reference to the following specification taken in connection with the drawings; in which:

FIGURE 14 is a plan view showing the arrangement of rod-like heating elements in a circular path to provide for efficient transfer of energy thereto;

FIGURE 15 is a sectional view indicated by line 15—15 on FIGURE 14 showing an annular plate-like holder for the heating elements of FIGURE 14;

FIGURE 16 is a plan sectional view similar to FIGURE 14 but showing the manner in which strips could be employed as heating elements instead of rods thereby increasing the ratio of surface area to volume of the heating elements;

FIGURE 17 is a perspective view of a heating element of FIGURE 16 showing the surrounding envelope partly broken away;

FIGURE 18 is a perspective view similar to FIGURE 17 but shows a graphite member being utilized as a heating element;

FIGURE 19 is a sectional view through a flask or end of the well portion at the bottom of a flask showing a cylindrical graphite member forming the heating element;

FIGURE 20 is a fragmentary sectional view showing how the principles of the present invention could be adapted to a conventional container such as a flask having no well at the bottom.

*General Arrangement*

The present invention is generally concerned with the development of heat in a body of liquid by the electromagnetic transfer of energy.

In brief, an electrical conductor is placed within a body of liquid and a coil is placed outside the body of liquid so that the conductor member will be in the field of the coil.

The coil is then energized with a high frequency electrical current and this will cause eddy currents to be induced in the coil member which will bring about heating of the conductor member in the liquid and which heat will be absorbed by the liquid.

According to a preferred arrangement of this invention, a glass flask has a well formed at the bottom in which there is placed a group of metal rods. A high frequency coil is placed around the well and when energized will cause heating of the rods, thereby heating the liquid.

Where liquids are corrosive, the rods which are preferably a high melting point alloy, such as Nichrome, are enclosed within corrosion resistant sleeves, such as high temperature glass or quartz.

According to another modification of my invention the conductor members which are disposed in the body of the liquid are in form of tubes, so that liquid can circulate freely therethrough.

*Structural Arrangement*

Figure 1:
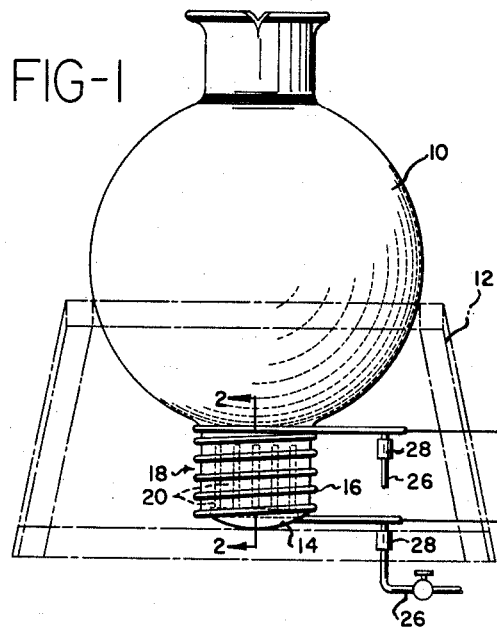
FIGURE 1 is an elevation of a flask and a heating arrangement according to this invention, associated therewith.

Referring to the drawings more in detail, FIGURE 1 shows a flask 10 supported on any suitable support arrangement 12. The flask comprises a dependent well 14, about which is disposed an electric coil 16.

This coil when energized with high frequency electric current, transmits energy to a group of rods generally indicated at 18 inside the well.

Figure 2:
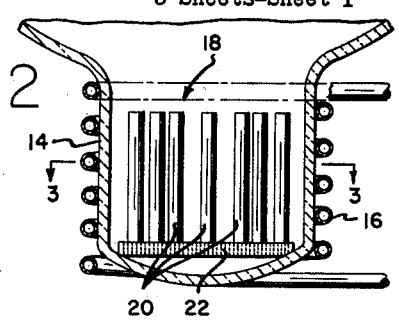
FIGURE 2 is a vertical sectional view indicated by line 2—2 on FIGURE 1, and drawn at somewhat enlarged scale.
Figure 3:
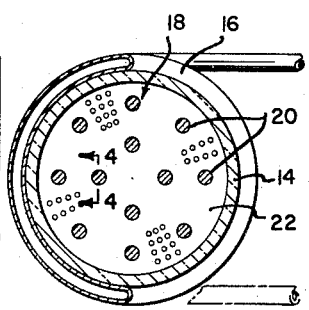
FIGURE 3 is a plan sectional view indicated by line 3—3 on FIGURE 2.

As will be seen in FIGURES 2 and 3, there are a plurality of individual rods 20 arranged and distributed in spaced relation in the well and supported on a plate 22. This plate may be apertured to permit the circulation of liquid therethrough, to prevent entrapping of liquid in the extreme bottom of the well.

The flask is quartz, or glass, or ceramic, the essential thing being for the material to be electrically non-conductive as well as being non-magnetic.

Figure 4:
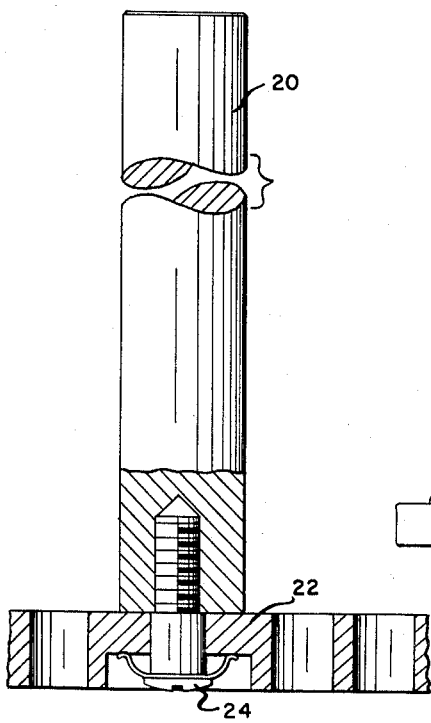
FIGURE 4 is a sectional view indicated by line 4—4 on FIGURE 3, drawn at a considerably enlarged scale.

As will be seen in FIGURE 4, the rods 20 may be attached to plate 22 as by shoulder screws 24.

The aforementioned electrical coil 16 is preferably in the form of a tube so that cooling water can be supplied thereto by the conduits 26. These conduits are insulated from coil 16 by the insulating connectors 28. The opposite ends of coil 16 are connected to the terminals of a high frequency generator 30, which may be any commercial unit of the proper size and frequency range to provide for the inductive heating of the rods 20.

As mentioned before, the rods 20 are preferably of a high melting point alloy, such as Nichrome and may be used without any protective sheath in a great many liquids. However, where corrosive liquids are to be heated or distilled, it is necessary to protect the metal rods from the action of the chemical being heated thereby.

Figure 5:
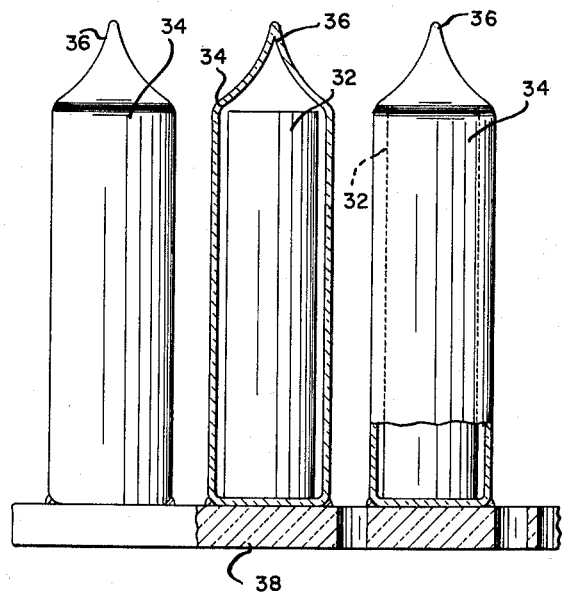
FIGURE 5 is a view showing a modified arrangement wherein the heating elements are enclosed within evacuated, corrosion resistant sleeves, such as quartz.

One such arrangement is illustrated in FIGURE 5, wherein the rods 32, are located inside the high temperature glass or quartz 34. These sleeves are evacuated and when evacuated are sealed at their tips 36. These sleeves 34 are then carried by a holder, such as the plate 38 in FIGURE 5, which will support the tubes in an upright distributed relation.

For certain classes of work, where the temperature limits are not too high, the metal rods could be provided with close fitting, high temperature glass or corrosion resistant sleeves with the sleeve material being so compounded and selected as to have substantially the same co-efficiencies of thermoexpansion as the metal rod.

Figure 6:
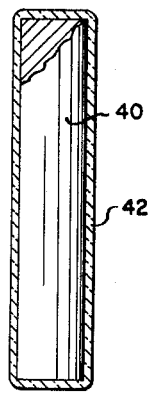
FIGURE 6 is a view of another modification showing a heating element with a closely fitting corrosion resistant sleeve.

FIGURE 6 shows an arrangement wherein the metal rod is indicated by 40, and the close fitting corrosion resistant sleeve is at 42.

Figure 7:
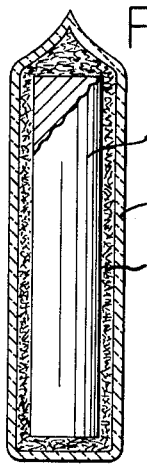
FIGURE 7 is a view showing a heating element in a corrosion resistant sleeve with a packing between the heating element and the sleeve of heating resistant materials.

In other cases as is illustrated in FIGURE 7, a metal rod 44, disposed within a corrosion resistant sleeve 46, could be surrounded by a finely comminuted material 48, which will hold the metal rod in spaced relation to the surface of the sleeve and will assist in the transfer of heat from the rod to the sleeve.

Figure 9:
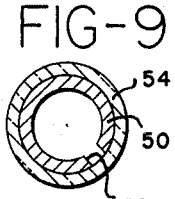
FIGURE 9 is a plan sectional view indicated by line 9—9 on FIGURE 8.
Figure 8:
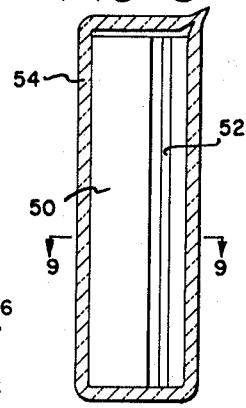
FIGURE 8 is a view like FIGURE 6, but shows a split tube as the heating element inside the corrosion resistant sleeve.

Inasmuch as the heating of metal objects by electromagnetic induction becomes more and more a skin effect as the frequency increases, it is also possible for the heating element to be in the form of a tube as is illustrated at 50 in FIGURES 8 and 9. A tube of this nature could be split as at 52, and this would permit a corrosion resistant sleeve 54, to be placed thereabout in close fitting relation to the split tube with some end clearance without the differential expansion causing breakage of the corrosive sleeve.

Figure 10:
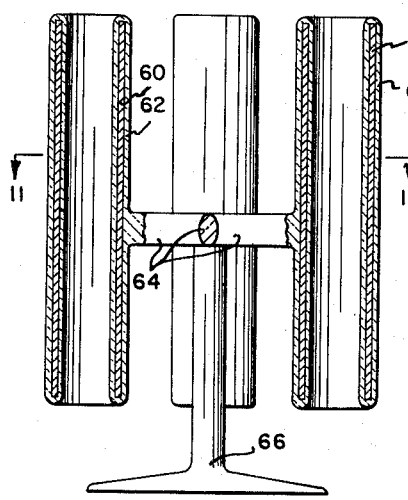
FIGURE 10 is a view, partially in section, showing a modification in which the heating elements are tubular members enclosed within the sleeve to permit liquid to circulate therethrough.
Figure 11:
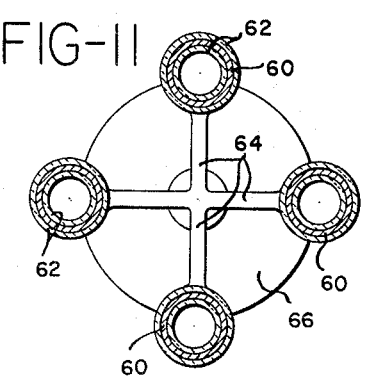
FIGURE 11 is a plan sectional view indicated by line 11—11 on FIGURE 10.

FIGURES 10 and 11 show another manner in which tubular heating elements could be employed. In these figures, metal tubes 60 are provided with tubular corrosion resistant sleeves 62, which may be close fitting about the heating elements, or which may loosely fit thereabout, depending on whether or not differential expansion of the heating elements and sleeves must be taken into account.

The sleeves 62 may be interconnected by arms 64, of a supporting holder 66, which may rest on the bottom of the well of the flask.

Figures 12, 21:
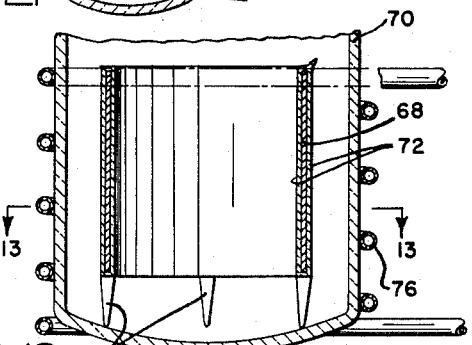
FIGURE 12 is a vertical sectional view through the heating wall of a flask showing a single large tubular heating element therein.
FIGURE 21 is a fragmentary vertical sectional view showing the lower portion of a vessel having two heating elements therein at different levels.
Figure 13:
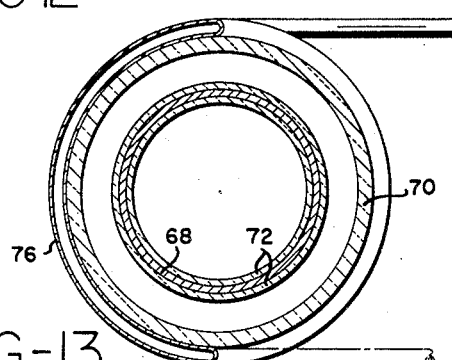
FIGURE 13 is a plan sectional view indicated by line 13—13 on FIGURE 12.

FIGURES 12 and 13 show still another arrangement wherein there is a single large metal tube 68, disposed in the well 70 of the flask. This sleeve 68, may be enclosed in a corrosion resistant member 72, and which member may comprise supporting legs 74, so that the sleeve is supported upwardly from the bottom of the flask well. In any of the several described arrangements, as illustrated in FIGURE 12, there would be an electric induction coil 76, surrounding the well for transferring energy into the metal heating elements, whether they be in the form of rods or sleeves.

In general, a plurality of individual heating elements would be preferred because they would present a larger heating surface to the liquid.

These elements could be in the form of rods or sleeves, and, as explained above, made by bare metal or they could be enclosed in a corrosion resisting, heat resisting, envelopes of the nature disclosed.

While the apparatus of the present invention, and the method disclosed herein, can best be practiced in connection with a flask having a dependent well portion at the bottom, it will also be apparent that the method and apparatus could be employed with conventional, non-conductive vessels, whereby it was possible to place the metal heating elements inside the vessel and bring an induction coil into operative relation relative thereto on the outside of the vessel.

FIGURES 14 and 15 show one arrangement of a rod-like heating element which has been found to be efficient. In these figures, the rod-like heating elements 80 are enclosed in envelopes 82 which are glass or quartz and which envelopes have stud-like projections 84 at their lower ends that can be received in apertures in a support ring 86 which can rest in the bottom of the vessel containing the liquid to be heated and which bottom might or might not comprise a well.

It will be noted that the heating elements are arranged in a circular path so as to approximate the effect of a single cylindrical heating element which has been found to be the most efficient.

In FIGURES 16 and 17, I show the arrangement in a circular path of strip-like members 88 each of which may be enclosed in an envelope 90 having a projecting portion 92 at the bottom adapted for being received in slots in a support plate 94.

Many times, graphite is a suitable material for being immersed in liquids to be heated without any protective coating being applied to the graphite. With this in mind, FIGURE 18 shows graphite strips 96 supported in a holder plate 98. A plurality of the strips 96 arranged in a circular path similarly, as is shown in FIGURES 14 and 16, would approximate the effect of a cylindrical heating member.

FIGURE 19 shows a cylindrical graphite member 100 disposed in a well 102 or in the bottom of a cylindrical vessel with an induction coil 104 in surrounding relation thereto externally of the vessel.

FIGURE 20 illustrates the manner in which an induction coil 106 could be formed so as to fit against a curved or flat wall of a vessel, preferably at the bottom, so as to transfer energy to a heating member 108 inside the vessel on the bottom and which member 108 could be, as illustrated, a graphite ring or could be conductive material of another nature, even including loose pieces of graphite or metal, either with or without protective envelopes.

FIGURE 21 shows how two cylindrical heating elements 110 and 112 could be arranged at different levels within a receptacle 114 which could be of a type having no well, such as a cylindrical container, and each heating element having pertaining thereto an individual high frequency coil as at 116 and 118.

The transmission of energy into the heating elements would be the same as for the modifications previously described.

There has been specifically disclosed in this application metal and graphite, but it will be understood that at least these terms are intended to include, within the purview of this invention, such materials as sintered powdered metals or mixtures of metal and graphite and the like.

Any material having the characteristics of becoming hot when linked by a high frequency magnetic field and being resistant to chemical attack by the liquid in which it is placed, or having the capacity of being shielded against such attack would be suitable for the purpose of the present invention.

It will be understood that this invention is susceptible to modification, in order to adapt it to different usages and conditions, and, accordingly, it is desired to comprehend such modifications within this invention as may fall within the scope of the appended claims.

I claim:

1. An apparatus for heating liquids comprising; an electrically non-conductive glass vessel, a well formed in the bottom portion of said vessel, an electrically conductive means in said well and spaced from the walls of the well, and an electrical coil surrounding the well outside the vessel adapted for being energized with high frequency electrical energy for inducing electrical currents in said electrically conductive means thereby to cause heating of said means and consequent heating of the liquid in the vessel, said electrically conductive means comprising a plurality of rods arranged vertically in said well in spaced parallel relation.

2. An apparatus for heating liquids comprising; an electrically non-conductive glass vessel, a well formed in the bottom portion of said vessel, an electrically conductive means in said well and spaced from the walls of the well, and an electrical coil surrounding the well outside the vessel adapted for being energized with high frequency electrical energy for inducing electrical currents in said electrically conductive means thereby to cause heating of said means and consequent heating of the liquid in the vessel, said electrically conductive means comprising a plurality of rods arranged vertically in said well in spaced parallel relation, each of said rods being surrounded by and hermetically sealed in a corrosion resistant envelope.

3. An apparatus for heating liquids comprising; an electrically non-conductive glass vessel, a well formed in the bottom portion of said vessel, an electrically conductive means in said well and spaced from the walls of the well, and an electrical coil surrounding the well outside the vessel adapted for being energized with high frequency electrical energy for inducing electrical currents in said electrically conductive means thereby to cause heating of said means and consequent heating of the liquid in the vessel, said electrically conductive means comprising a plurality of rods arranged vertically in said well in spaced parallel relation, each of said rods being surrounded by and hermetically sealed in a corrosion resistant envelope, each rod being supported in its envelope by heat resistant electrically non-conductive comminuted material.

4. An apparatus for heating liquids comprising; an electrically non-conductive glass vessel, a well portion in the lower portion of said vessel, a coil surrounding the vessel, and electrically conductive means disposed in the well portion of the vessel positioned to be linked by the magnetic field of the coil when the coil is energized, said coil being adapted for being energized with high frequency electrical energy for inducing electric currents in said electrically conductive means in the vessel to cause heating of the said means and thereby to heat liquid in the vessel, said electrically conductive means comprising circular metal sleeve members arranged in vertical parallel spaced relation in said vessel in about the same transverse plane as said coil.

5. An apparatus for heating liquids comprising; an electrically non-conductive glass vessel, a coil surrounding the vessel, a well formed in the bottom portion of said vessel, and electrically conductive means in the vessel the main body of which is spaced from the bottom and side walls of said vessel and positioned to be linked by the magnetic field of the coil when the coil is energized, said coil being adapted for being energized with high frequency electrical energy for inducing electric currents in said electrically conductive means in the vessel to cause heating of the said means and thereby to heat liquid in the vessel, said electrically conductive means comprising cylindrical metal elements arranged in vertical parallel spaced relation in the vessel in about the same transverse plane as said coil and spaced from the wall of the vessel, and means supported by the vessel attached to and supporting said cylindrical metal elements.

6. An apparatus for heating liquids comprising; an electrically non-conductive vessel, a coil surrounding the vessel, a well formed in the bottom portion of said vessel, and electrically conductive means in the vessel the main body of which is spaced from the bottom and side walls of said vessel and positioned to be linked by the magnetic field of the coil when the coil is energized, said coil being adapted for being energized with high frequency electrical energy for inducing electric currents in said electrically conductive means in the vessel to cause heating of the said means and thereby to heat liquid in the vessel, said electrically conductive means comprising cylindrical metal elements arranged in vertical parallel spaced relation in the vessel in about the same transverse plane as said coil and spaced from the wall of the vessel, and means supported by the vessel attached to and supporting said cylindrical metal elements, said metal elements comprising rods.

7. An apparatus for heating liquids comprising; an electrically non-conductive vessel, a coil surrounding the vessel, a well formed in the bottom portion of said vessel, and electrically conductive means in the vessel the main body of which is spaced from the bottom and side walls of said vessel and positioned to be linked by the magnetic field of the coil when the coil is energized, said coil being adapted for being energized with high frequency electrical energy for inducing electric currents in said electrically conductive means in the vessel to cause heating of the said means thereby to heat liquid in the vessel, said electrically conductive means comprising cylindrical metal elements arranged in vertical parallel spaced relation in the vessel in about the same transverse plane as said coil and spaced from the wall of the vessel, and means supported by the vessel attached to and supporting said cylindrical metal elements, said metal elements comprising hollow sleeves.

8. An apparatus for heating liquids comprising; an electrically non-conductive vessel, a coil surrounding the vessel, a well formed in the bottom portion of said vessel, and electrically conductive means in the vessel the main body of which is spaced from the bottom and side walls of said vessel and positioned to be linked by the magnetic field of the coil when the coil is energized, said coil being adapted for being energized with high frequency electrical energy for inducing electric currents in said electrically conductive means in the vessel to cause heating of the said means thereby to heat liquid in the vessel, said electrically conductive means comprising cylindrical metal means arranged in vertical parallel spaced relation in the vessel in about the same transverse plane as said coil and spaced from the wall of the vessel, and means supported by the vessel attached to and supporting said cylindrical metal means, said cylindrical metal means being surrounded by a heat and corrosion resistant sleeve means and hermetically sealed therein.

9. An apparatus for heating liquids comprising; an electrically non-conductive vessel, a coil surrounding the vessel, a well formed in the bottom portion of said vessel, and electrically conductive means in the vessel the main body of which is spaced from the bottom and side walls of said vessel and positioned to be linked by the magnetic field of the coil when the coil is energized, said coil being adapted for being energized with high frequency electrical energy for inducing electric currents in said electrically conductive means in the vessel to cause heating of the said means thereby to heat liquid in the vessel, said electrically conductive means comprising cylindrical metal elements arranged in vertical parallel spaced relation in the vessel in about the same transverse plane as said coil and spaced from the wall of the vessel, and means supported by the vessel attached to and supporting said cylindrical metal elements, said metal elements comprising split sleeves and a corrosion and heat resistant cylindrical electrically non-conductive element surrounding each said split sleeve and within which each said split sleeve is hermetically sealed.

10. An apparatus for heating liquids comprising; an electrically non-conductive vessel, a coil surrounding the vessel, a well formed in the bottom portion of said vessel, and electrically conductive means in the vessel the main body of which is spaced from the bottom and side walls of said vessel and positioned to be linked by the magnetic field of the coil when the coil is energized, said coil being adapted for being energized with high frequency electrical energy for inducing electric currents in said electrically conductive means in the vessel to cause heating of the said means and thereby to heat liquid in the vessel, said electrically conductive means comprising metal sleeve means in said vessel spaced from the wall thereof to permit liquid to circulate thereabout and located substantially at the strongest part of the magnetic field established by said coil upon energization thereof.

11. An arrangement for heating liquids comprising; an electrically non-conductive vessel, a pair of induction coils external of the vessel adapted when energized with high frequency electrical energy to establish magnetic fields inside the vessel in the regions of the respective coils, and electrically conductive means inside the vessel spaced from the bottom and side walls of said vessel and positioned therein relative to the said magnetic fields so as to be linked thereby for the transfer of energy into said electrically conductive means, said electrically conductive means comprising cylinders and each said cylinders and the coil pertaining thereto being arranged in vertically spaced relation from the other cylinder and its coil.

12. An apparatus for heating liquids comprising an electrically non-conductive vessel, a well formed in the bottom portion of said vessel, an electric induction coil surrounding said well of the vessel, electrically conductive means comprising a heat and corrosion resistant solid material disposed in the well of said vessel the main body of which is spaced from the bottom and side walls of said well and positioned to be linked by the magnetic field of said induction coil for the transfer of energy into said electrically conductive solid material, said coil being adapted to be energized with high frequency electrical energy for inducing electric current in said electrically conductive solid material disposed in said well to cause heating of the said electrically conductive material and thereby to heat liquid as contained in said vessel, said electrically conductive material being arranged in said well in about the same transverse plane as said coil and spaced from the wall of the well.

References Cited in the file of this patent
UNITED STATES PATENTS

| | | |
|---|---|---|
| 479,814 | Kennedy | Aug. 2, 1892 |
| 932,242 | Berry | Aug. 24, 1909 |
| 1,763,229 | Fourment | June 10, 1930 |
| 1,904,214 | Fagan | Apr. 18, 1933 |
| 1,918,637 | Fendt et al. | July 18, 1933 |
| 2,179,838 | Young | Nov. 14, 1939 |
| 2,265,470 | Black | Dec. 9, 1941 |
| 2,916,599 | Stiles | Dec. 8, 1959 |
| 3,053,959 | Christmann | Sept. 11, 1962 |